May 16, 1961  R. FERWERDA  2,984,372
TELESCOPIC-BOOM-OPERATED DIGGING BUCKET
Filed Feb. 13, 1957  2 Sheets-Sheet 1

INVENTOR.
RAY FERWERDA
BY
*Hyde, Meyer, Baldwin & Doran*
ATTORNEYS

May 16, 1961 R. FERWERDA 2,984,372
TELESCOPIC-BOOM-OPERATED DIGGING BUCKET
Filed Feb. 13, 1957 2 Sheets-Sheet 2
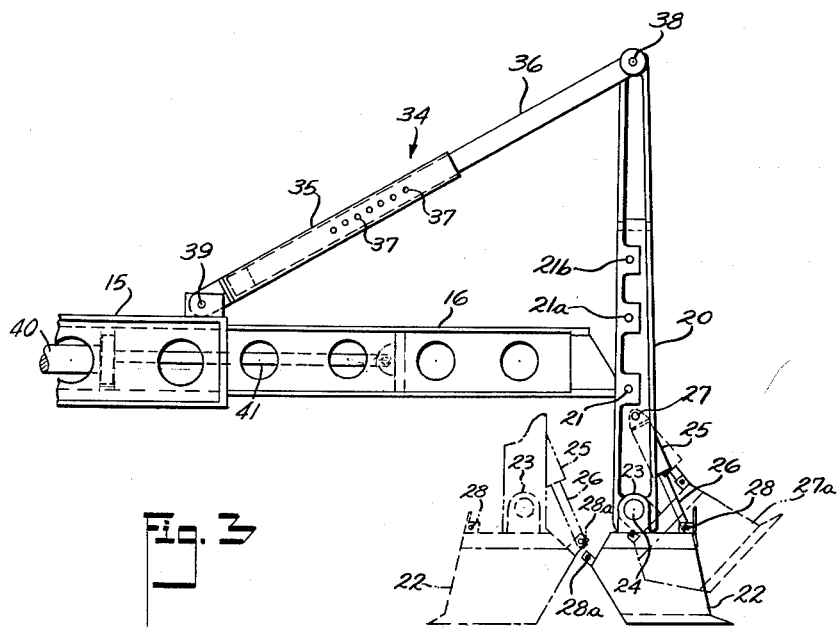
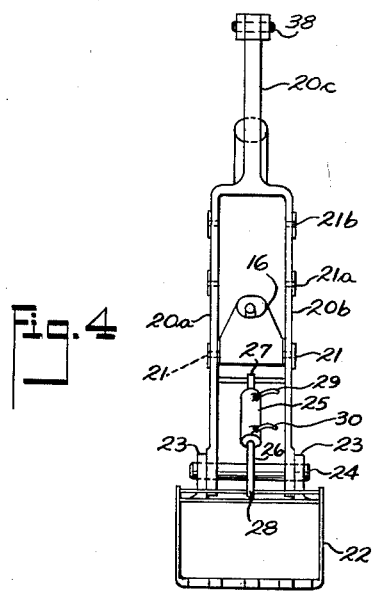
INVENTOR.
RAY FERWERDA
BY
ATTORNEYS

United States Patent Office 2,984,372
Patented May 16, 1961

2,984,372

TELESCOPIC-BOOM-OPERATED DIGGING BUCKET

Ray Ferwerda, 1050 NW. 163rd Drive, North Miami, Fla.

Filed Feb. 13, 1957, Ser. No. 639,885

2 Claims. (Cl. 214—138)

The present invention relates to improvements in power shovels and particularly to shovels of the type employing a telescopic boom.

An object of the present invention is to provide a power shovel having a main boom section and an extensible boom section together with a dipper stick pivotally mounted in its middle portion at the end of the extensible boom section so that one end of the dipper stick is disposed upwardly and the other end is disposed downwardly and carries a shovel bucket or other tool, and a rigid member or deadman having one end thereof pivotally connected to the upper end of the dipper stick and the other end thereof pivotally connected to the outer end of said main boom section whereby a very powerful controlled force can be applied to the dipper stick and its associated bucket without the use of cables.

Another object of the present invention is to provide a power shovel having a telescopic boom having main and extensible boom sections, a dipper stick mounted at its middle portion on the outer end of the extensible boom section, one end of said dipper stick being disposed upwardly and the other end being disposed downwardly and carrying a shovel bucket or other tool, and a deadman pivotally connected to the upper end of said dipper stick at one end and having its other end pivotally connected to the main boom section, said shovel bucket being reversible to accomplish disposition of the bucket in either of two operating positions for use either as a digging shovel or as a drag shovel.

Another object of the present invention is to provide a structure of the character described above which eliminates the use of chains and cables for operating the dipper stick and shovel and the play inherent therewith; and further to provide a construction wherein the operator has precise control of the digging operation and may apply very powerful forces which actuate the dipper stick and shovel bucket at relatively high speeds.

Another object of the present invention is to provide a power shovel having a telescopic boom operated digging bucket characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain advantages will be referred to in or will be evident from the following description of one embodiment of the invention, as illustrated in the accompanying drawings, in which Fig. 1 is a side elevational view showing a power shovel embodying the construction and principle of my invention, showing the shovel bucket adjusted for use as a drag shovel, and showing three positions of the shovel depending on the amount of boom extension.

Fig. 3 is an enlarged fragmentary sectional view of the outer end of the extensible boom including part of the main boom section and showing the details of construction with the shovel bucket adjusted as a scoop shovel in full lines and as a drag shovel in dotted lines.

Fig. 4 is an end elevational view of the dipper stick and associated shovel bucket of Fig. 3.

Figure 1:
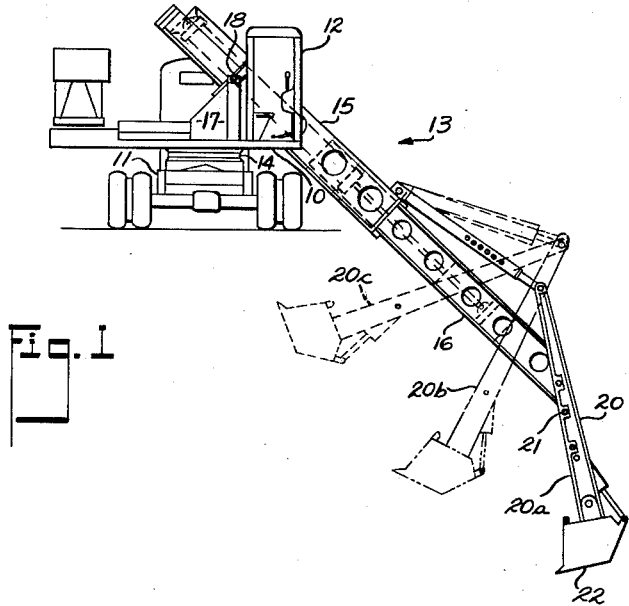

Before describing in detail herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Refering now to the drawings wherein similar reference characters designate corresponding parts throughout, the apparatus includes the equipment carrying and operating floor 10, and associated carriage structure 11 and preferably includes the usual cab 12 or other protective means for the operator.

Figure 2:
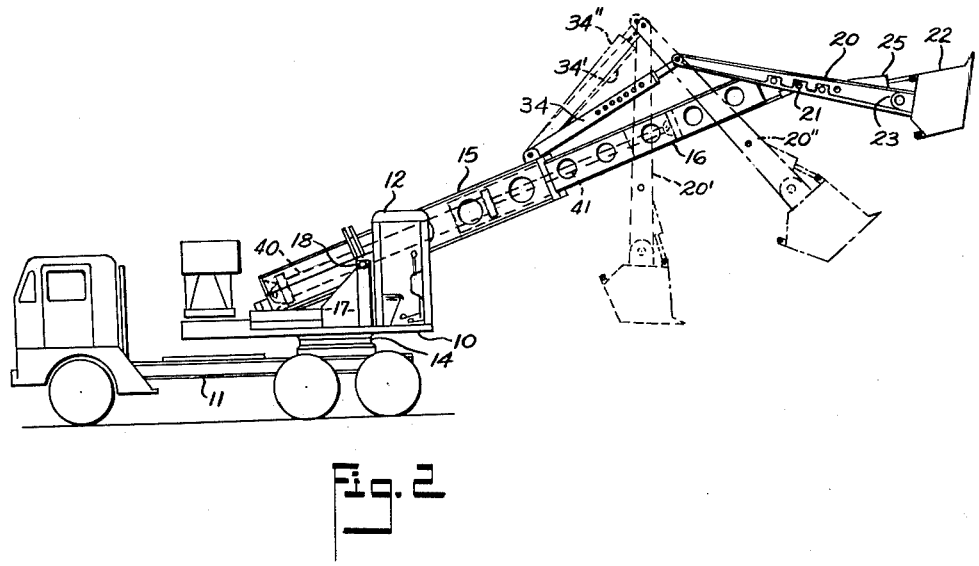
Fig. 2 is a side elevational view similar to Fig. 1 and showing the extensible boom in an elevated position and the shovel bucket adjusted in a positive or scoop shovel position, there being three positions of the shovel shown depending on the amount of boom extension.

For more pertinent details, reference may be had to my U.S. Patent No. 2,541,045, granted February 13, 1951. The present invention is intended to be mounted on an extensible boom as shown in said patent, said boom being mounted on a table for pivoting of the main boom section about a horizontal axis 18, for rotating said main boom section about its own longitudinal axis, and said table being rotatable on the carriage 11. An elongated boom 13 has one end thereof swingably mounted to the operating table floor 10 so that the boom extends outwardly and is capable of swinging movement in a substantially vertical path as seen in Figs. 1 and 2. The floor 10 is mounted for rotation on a suitable supporting bearing or turntable 14 which permits the boom to be rotated 360° in a substantially horizontal plane. The boom 13 includes the main boom section 15 and an extensible or auxiliary boom section 16 which is telescopically slidable in the main boom section 15. Here, a cylinder and piston motor, 40–41, is connected between the main and extensible boom sections for extending and retracting the boom exactly as shown in my Patent No. 2,541,045.

The extensible boom section 16 is very similar in cross-section to the main boom section 15, as shown in said patent. Suitable means are provided within the structure so as to reduce friction to a minimum whereby the extensible boom section may move inwardly and outwardly of the main boom section with little effort.

A dipper stick 20 is pivotally connected to the free end of the extensible boom section 16 at 21. The dipper stick 20 as seen in Figs. 1 and 2 is pivotally mounted substantially at its middle portion with one end extending downwardly and carrying a shovel bucket 22 and with the other end extending upwardly beyond the pivotal connection with the extensible boom section 16. It will be understood that any other type of suitable operating tool may be substituted for the bucket 22.

The shovel bucket 22 may be mounted at the lower end of the dipper stick for use either as a shovel as seen in Fig. 2 or as a drag shovel as seen in Fig. 1. The shovel is provided with a pair of spaced, upstanding lugs 23 which are adapted to embrace the lower end of the dipper stick 20 and are retained thereon by means of a pivot pin 24 which is fitted through registering openings formed transversely through the lugs 23 and the lower end of the dipper stick.

In order to reverse the direction in which the shovel bucket faces, it is only necessary to remove the pivot pin 24 between the dipper stick and the spaced lugs 23 of the bucket 22 and then reverse the shovel bucket through a half turn or substantially 180° and then again insert the pin 24 so as to secure the lugs 23 to the lower end of the dipper stick.

Means are provided for rocking or dumping the shovel bucket 22 from the full line position 22 to the dotted line position 22a as seen in Fig. 3, relative to the dipper stick 20. Such means take the form of a double-acting cylinder and piston motor having a cylinder 25 and piston rod member 26, as seen in Figs. 3 and 4. The upper end of the cylinder 25 is pivotally connected to the dipper stick at 27 while the lower end is pivotally connected to the bucket at 28 in a digging position and at 28a when the shovel is used in a drag position as seen in Fig. 3. The piston rod is actuated within the cylinder by means of a suitable fluid under pressure which reaches the cylinder 25 by means of lines 29 and 30, as seen in Fig. 4.

A suitable rigid member or deadman 34 is provided between the main boom section and the upper end of the dipper stick as seen in Figs. 1, 2 and 3. Preferably, the deadman is adjustable in length. Here the deadman 34 is made up of a main section 35 and an auxiliary section 36 which is telescopically adjustable within the main section 35. The auxiliary section 36 may be adjusted to several different lengths of extension, by means of a plurality of spaced holes 37 which are aligned with a hole in section 36 and retained in an adjusted position by means of a suitable pin. The cylinder 35 might be filled with incompressible liquid and the member 36 could be fitted with a piston head in the cylinder. Then the length of 35—36 could be adjusted by varying the amount of liquid in cylinder 35. As seen in Fig. 3, the extensible member is shown in its innermost position. The outer end of the auxiliary section 36 is pivotally connected to the upper end of the dipper stick at 38. The inner end of the main section 35 is pivotally connected to the outer end of the main boom section 15 at 39. The deadman forms a rigid support member between the outer end of the main boom section 15 and the upper end of the dipper stick 20. It will be understood that I do not wish to limit myself to the position of the deadman shown in the present drawings, as it will be understood that the deadman could have one end attached at another point along the dipper stick 20 and the other end attached at a fixed point other than to the main boom section 15. The dipper stick 20 is provided with a bifurcated lower end portion comprising two parallel frame members 20a and 20b joined with a single structural section 20c as shown in Fig. 4. The bifurcated portions are provided with a plurality of vertically spaced aligned apertures at 21, 21a and 21b which permit attachment of the dipper stick 20 to the outer end of the auxiliary boom section 16 at various points along the length of the dipper stick. As seen in Fig. 3, the outer end of the auxiliary boom 16 is attached to the first or lowermost pair of aligned apertures in the dipper stick 20. The outer end of the auxiliary boom 16 is secured between the bifurcated portions of the dipper stick by means of suitable pivot pins which engage the aligned apertures contained in the bifurcated members of the dipper stick and a complementary aligned aperture contained in the end of the auxiliary boom section 16. Thus, with the parts assembled in the manner as described, the dipper stick and its associated shovel bucket are directly actuated and moved upon inward or outward telescopic movement of the auxiliary boom section 16 within the main boom section 15. Referring now to Fig. 2, it will now be seen that upon initial outward telescopic movement of the auxiliary boom section 16 the dipper stick 20 and the associated deadman 34 travel from the first dotted line position 34', 20' to the second dot-dash position 34", 20" and, upon further boom extension, to the third full line position. It will be noted that as the auxiliary boom section 16 is extended outwardly from the main boom section, the dipper stick 20 pivots about the end of the auxiliary boom section at 21 whereby the lower shovel supporting end thereof swings forwardly and upwardly while the upper end of the dipper stick 20 (since it is pivotally connected to the deadman 34) swings inwardly and downwardly.

It will also be understood that the bucket may be used in a digging or drag position as seen in Fig. 1. Here upon inward telescopic movement of the boom section 16 the dipper stick and the associated deadman 34 travel from the first full line position 20a to the second dot-dash position 20b and upon further boom retraction to the third dotted line position 20c.

It will be understood that since the deadman 34 is secured to the outer end of the main boom section 15, the arc through which the outer end of the deadman may rotate or swing is determined by its pivotal connection at 39. The upper end of the dipper stick 20 pivotally secured to the free end of the deadman at 38 if it is to move must travel in an arc whose center is located at 39 and whose radius is defined by the length of the deadman 34. Thus, as the auxiliary boom 16 is extended outwardly of the main boom section 15, the angular relationship between the dipper stick and the deadman must of necessity change. A triangular relationship always exists between the pivot points 21, 38 and 39 and in any given position, the lengths of the triangle defined by the deadman, and the length of the dipper stick between the pivot points 21 and 38 remaining fixed during operation. Only the remaining side of the triangle formed by the extensible boom section 16 varies as it is telescoped inwardly and outwardly of the main boom section 15. Thus, with this telescopic action it will be understood that the angular relationship between the various sides of the triangle must accommodate one another as the auxiliary boom 16 becomes longer or shorter while the remaining two sides remain fixed.

With this novel construction, it is possible to exert a powerful force upon the dipper stick 20 and its associated shovel bucket 22. Since the upper end of the dipper stick 20 is fixed by the means of the deadman to the outer end of the main boom section 15, it is possible through this lever arrangement to gain increased force at the lower end of the dipper stick containing the shovel bucket 22. That is, the force of the auxiliary boom section 16 as it is extended or retracted is substantially multiplied due to the lever action gained through the various pivotal connections 21, 38 and 39 and the associated rigid deadman 34.

It will be understood that the action of the auxiliary boom 16 remains constant while the lengths of the various lever arms may be changed by the adjustable mounting means of the dipper stick and the deadman 34 as heretofore described. As viewed in Fig. 1, it will be seen that the shovel bucket 22 is in an operative or cutting action upon retraction of the auxiliary boom section 16 within the main boom section 15, while in Fig. 2 the shovel bucket is shown in an operative or cutting action upon extension of the auxiliary boom section 16 outwardly of the main boom section 15. The cutting operation is dependent upon the arrangement of the shovel bucket on the lower end of the dipper stick.

I have thus provided a novel telescopic boom operated digging bucket actuated by powerful sources which originate through the direct action of a telescopic boom; one which incorporates a dipper stick pivotally mounted on the end of an extensible boom so that one end of the dipper stick is disposed upwardly and the other end is disposed downwardly and carries a shovel bucket, whereupon movement of said extensible boom section causes a powerful force to be exerted directly upon the dipper stick and its associated shovel bucket.

In view of the foregoing description, taken in conjunction with the accompanying drawings, it is believed that a clear understanding of the construction, operation and advantages of the present device will be quite apparent to those skilled in the art.

Having thus described my invention and illustrated its use, what I claim is new and desire to secure by Letters Patent is:

1. An excavator comprising a base, a boom pivotally mounted on said base for movement in both a vertical and horizontal plane, said boom comprising a main boom section and an extensible boom section, said extensible boom section telescopically mounted on said main boom section, a dipper stick pivotally mounted at its middle portion to the outer end of said extensible boom section, one end of said dipper stick disposed upwardly and the other end being disposed downwardly, a trenching bucket pivotally secured to the lower end of said dipper stick, power means secured between said dipper stick and said bucket for rocking said bucket relative to said dipper stick, adjustment means on said dipper stick permitting adjustment of said dipper stick relative to its length on the end of said extensible boom section, a rigid strut member having one end thereof pivotally connected to the upper end of said dipper stick and the other end thereof pivotally connected to the outer end of said main boom section, and power means independent of said dipper stick for extending and retracting said extensible boom section, so that said dipper stick and associated bucket are actuated by the force from the direct extension and retraction movement of said extensible boom section with this force being exerted by said extensible boom section through said outer end, pivotal mount to said dipper stick, dipper stick and trenching bucket while said rigid strut member acts as a swinging fulcrum for said dipper stick; said adjustment means including said dipper stick being provided with a plurality of vertically spaced apertures, the outer end of said extensible boom section being provided with an aperture whereby the dipper stick may be selectively adjusted relative to its length on the end of the extensible boom section, and a suitable pivot pin insertable through the aligned apertures of said dipper stick and extensible boom section retaining said members together.

2. An excavator comprising a base, a main boom section pivoted thereto, an extensible boom section telescopically mounted on said main boom section, a dipper stick pivotally mounted intermediate its ends on the outer end of said extensible boom section, said dipper stick having a plurality of vertically spaced securing means, said outer end of said extensible boom section attachable to a selected one of said first named securing means whereby the dipper stick may be selectively adjusted relative to its length on the end of the extensible boom, a trenching bucket pivotally mounted on the lower end of said dipper stick, a rigid member having one end thereof pivotally secured to the upper end of said dipper stick and the other end thereof pivotally secured to the outer end of said main boom section, said rigid member comprising a main section and an extensible section which is telescopically adjusted on said main section, means securing said main and extensible sections in any one of a plurality of positions of adjustment, power means independent of said dipper stick for extending and retracting said extensible boom section so that a powerful, direct, bucket actuating force is exerted by said extensible boom section through said outer end, securing means, dipper stick and trenching bucket upon extension and retraction of said extensible boom section while said rigid member acts as a swinging fulcrum for said dipper stick, and power means operatively connected between said trenching bucket and said dipper stick for varying the position of said trenching bucket about its pivotal mounting, said first mentioned power means including a double acting piston and cylinder motor operatively connecting said boom sections for exerting the sole power force for moving said bucket by said dipper stick.

References Cited in the file of this patent

UNITED STATES PATENTS

| 1,085,035 | Greimann | Jan. 20, 1914 |
| 2,107,895 | Lundstrom | Feb. 8, 1938 |
| 2,109,388 | Heller | Feb. 22, 1938 |
| 2,718,312 | Pilch | Sept. 20, 1955 |
| 2,840,254 | Bevan | June 24, 1958 |

FOREIGN PATENTS

| 130,236 | Sweden | Nov. 28, 1950 |